No. 708,544. Patented Sept. 9, 1902.
E. J. GUENZEL.
STRAINER FOR COFFEE POTS.
(Application filed Aug. 26, 1901.)
(No Model.)
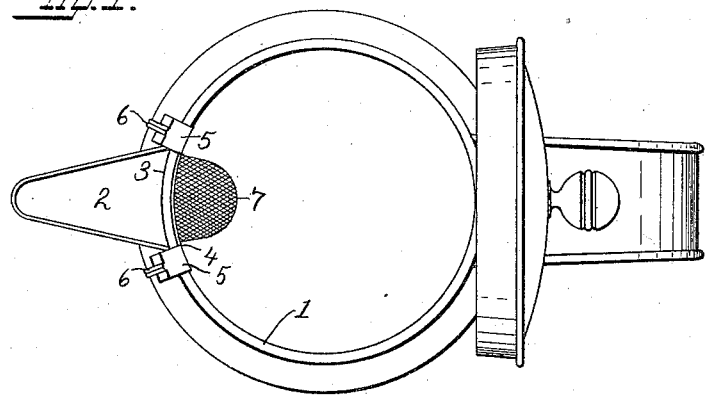
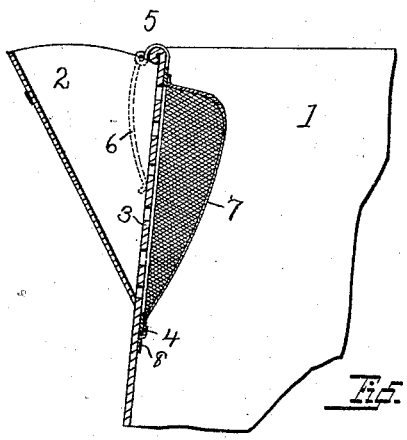 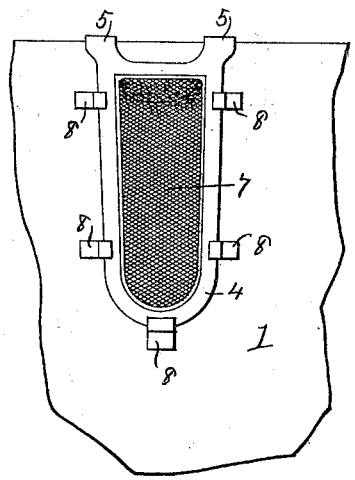
Witnesses:
Inventor
Ernst J. Guenzel
By Erwin E. Wheeler
Attorneys.

UNITED STATES PATENT OFFICE.

ERNST J. GUENZEL, OF MILWAUKEE, WISCONSIN, ASSIGNOR OF ONE-HALF TO FRANK F. DITTMAR, OF MILWAUKEE, WISCONSIN.

STRAINER FOR COFFEE-POTS.

SPECIFICATION forming part of Letters Patent No. 708,544, dated September 9, 1902.

Application filed August 26, 1901. Serial No. 73,256. (No model.)

*To all whom it may concern:*

Be it known that I, ERNST J. GUENZEL, a citizen of the United States, residing at Milwaukee, county of Milwaukee, and State of Wisconsin, have invented new and useful Improvements in Strainers for Coffee-Pots, of which the following is a specification.

My invention relates to improvements in auxiliary strainers for coffee-pots and similar receptacles.

The object of my invention is to provide an auxiliary strainer which can be readily inserted in the receptacle and is held firmly in place over the discharge-apertures while in use, but which can be easily removed when it is desired to clean the receptacle.

In the following description reference is had to the accompanying drawings, in which—

Figure 1 is a top view of the coffee-pot with my invention applied thereto. Fig. 2 is a sectional view of the pouring-nozzle and adjacent portions of the pot, showing my invention in position. Fig. 3 is an interior view showing my invention and the holding-clasps for retaining it in contact with the side of the pot. Fig. 4 is a detail view, in cross-section, of a portion of the strainer, showing the peculiar shape of the marginal plate.

Like parts are identified by the same reference-figures throughout the several views.

1 is a coffee-pot of ordinary construction.

2 is a discharge-nozzle, Fig. 2.

3 is the perforated portion of the wall of the pot, which affords communication with the discharge-nozzle.

A frame 4 is formed to fit the interior surface of the coffee-pot around the perforated portion 3 and is provided with hooks 5, which engage over the upper edge of the pot on each side of the discharge-nozzle. Each hook is provided with a depending arm 6, of elastic material, such as spring-wire, which is adapted to engage forcibly on the exterior surface of the pot to prevent the frame from becoming dislodged after it is once adjusted in position. A screen, preferably composed of wire-cloth, is adjusted and secured to the frame 4 and projects inwardly within the coffee-pot, as best illustrated in Figs. 1 and 2, the screen being preferably made to taper downwardly, as shown in Fig. 2, so as to permit the coffee-grounds to readily drop away therefrom by gravity.

While the spring 6 is used to hold the frame and screen in position, yet it is obvious that a sudden tipping and shaking of the coffee-pot might cause the lower end of the frame to spring away from the interior surface, when the grounds would be permitted to enter the space in front of the screen. To prevent this, I provide the interior surface of the pot with metallic clips 8, which are offset and adapted to engage the sides and lower end of the frame 4, not only holding it in position, but serving as guides to facilitate readjusting the frame and screen when it has been removed. The bars of the frame 4 are slightly arched in cross-section, as shown in Fig. 4, thus providing two lines of contact, which renders the frame not only more effectual in excluding the grounds, but less liable to be disarranged in position by a dent or inequality in the surface of the pot itself.

It will of course be understood that it is immaterial whether the spring 6 engages the exterior surface of the receptacle exterior to the spout 2, as shown in Fig. 1, or within the spout 2, the essential requirement being that the spring shall be in the form of a suspensory hook extending over the upper portion or rim of the pot and bearing resiliently against some portion exterior to the body of the receptacle, so as to hold the frame firmly against the interior surface and permit of its insertion or removal without inserting the hand in the receptacle itself. I attach great importance to the use of the spring-hook, for where removable strainers are used they are always taken from the receptacle in order to be cleaned and frequently through inadvertence are not replaced until the receptacle is filled with boiling liquid, such as coffee, tea, or other beverages. It is also at times desirable to remove the strainer temporarily while the receptacle is in use in case the same becomes clogged with grounds or tea-leaves. With a hook of the character described the insertion and removal of the strainer under such circumstances are greatly facilitated and the hook serves to hold the strainer in position, preventing it from being displaced by the action of the liquid itself when the coffee-pot is tilted, thus enabling me to dispense with all interior fastenings. I also attach great importance to the use of the metallic clips 8, which serve to hold the lower end of the frame against displacement toward the center of the pot, but which are easily cleaned and do not clog with coffee-grounds, &c., as would be the case with continuous guide-channels.

I am aware that attempts have heretofore been made to provide coffee-pots with detachable strainers; but I believe that I am the first to provide effective means for securing such strainers in position so that they will not be disarranged by the action of the liquid when the receptacle is shaken or tilted, and I attach great importance to the means herein described for so securing the auxiliary screen, as any grounds which are permitted to pass the screen-holding frame will be retained between the screen and the pouring-apertures of the receptacle until discharged through the spout.

It will be observed that in the construction shown the spring-hooks engage the exterior surface of the coffee-pot at points considerably below the upper edge of the receptacle, preferably opposite the central portion of the screen, the hooks and the frame of the removable screen acting similarly to spring-actuated or self-closing tongs. The pressure of the screen-frame against the interior surface of the receptacle will of course be equal to that of the springs against the outer surface, and where strong springs are used the interior clips 8 may be dispensed with, as the springs acting at points opposite the central portion of the strainer will hold the latter to the receptacle-wall with equal force at both ends. This is especially of importance in applying my invention to receptacles already in use and not provided with the holding-clips 8.

Having thus described my invention, what I claim as new, and desire to secure by Letters Patent, is—

1. In a coffee-pot or similar receptacle, a suitable frame adapted to fit the interior surface of the receptacle around the pouring-spout; a screen secured to the frame in a position to cover the inlet of the spout; one or more suspensory spring-hooks secured to the frame and extending over the rim of the receptacle and downwardly to engage its exterior surface, said frame and hooks serving as a clamp to bind the screen firmly in position against the interior surface of the receptacle.

2. In a coffee-pot, or similar receptacle, a suitable frame, adapted to fit the interior surface of the receptacle around the pouring-spout; a screen secured to said frame in a position to cover the inlet of the spout; and one or more suspensory spring-hooks secured to the frame and extending over the rim of the receptacle and downwardly to a point opposite the central portion of the screen; said hooks and screen-frame being arranged to serve as a clamp to bind the screen in position.

In testimony whereof I affix my signature in the presence of two witnesses.

ERNST J. GUENZEL.

Witnesses:
LEVERETT C. WHEELER,
JAS. B. ERWIN.